UNITED STATES PATENT OFFICE 2,691,024

DIHYDROPYRROLO-(3.2-c) QUINOLINE DERIVATIVES

Hans Ulrich Hörlein, Hans Andersag, and Helmut Timmler, Wuppertal-Elberfeld, Germany, assignors to Schenley Industries, Inc., New York, N. Y., a corporation of Delaware No Drawing. Application April 28, 1953,
Serial No. 351,753

Claims priority, application Germany
May 26, 1952

4 Claims. (Cl. 260—288)

This invention relates generally to the synthesis of organic chemical compounds and, in a more particular sense, it is concerned with the synthesis of certain novel derivatives of 4-methyl-2,3 - dihydropyrrolo - (3.2 - c) quinoline. These novel compounds are useful in chemotherapy in the treatment of malaria and amoebiasis.

The novel compound of this invention is represented by the formula:

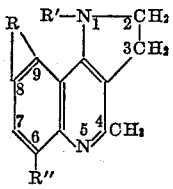

wherein R is a bridging group, linked to the pair of adjacent positions numbered 8, 9 of the bz-nucleus, chosen from the group of radicals represented by the formulae:

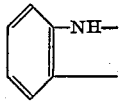

and

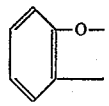

R' is chosen from the group consisting of methyl and diethylaminoethyl; and R" is chosen from the group consisting of hydrogen and methoxy.

The products of this invention can be prepared readily by condensing α-acetyl-γ-butyrolactone with 2-amino- or 3-amino-carbazole, or with 2-amino-3-methoxy-diphenylene oxide under conditions usual for formation of Schiff's base type compounds, treating this condensation product with a phosphorus oxyhalide in a liquid hydrocarbon solvent medium to cause cyclization and to yield a compound of the formula:

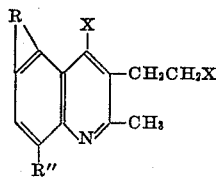

wherein X is a halogen and R and R" have the meanings above assigned, reacting this dihalo-compound, at an elevated temperature and in a semipolar organic solvent medium with a primary aliphatic amine chosen from the group consisting of methylamine and N,N-diethyl-ethylene diamine, then recovering from the reaction mixture the desired product, a bz-indolo- or a bz-benzofurano-, 1-methyl- or 1-β-diethylamino-ethyl-4-methyl-2,3-dihydropyrrolo-(3.2-c)quinoline, which may bear a 6-methoxy substituent, having the formula first set forth above.

To facilitate a better understanding of this invention, especially of the preferred methods for preparing the products of the invention, certain non-limitative and merely illustrative examples follow wherein the methods for synthesizing these novel compounds are described in detail.

Example 1

Synthesis of the compound represented by the formula:

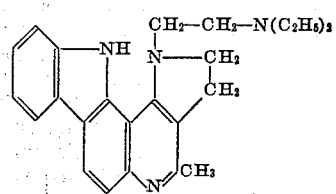

2-aminocarbazole and α-aceto-γ-butyrolactone are condensed under the conditions usual for formation of Schiff's bases and this condensation product is treated with phosphorus oxychloride in a liquid hydrocarbon solvent medium to cause cyclization and to yield the dichloro-derivative, melting point, 212° C., represented by the formula:

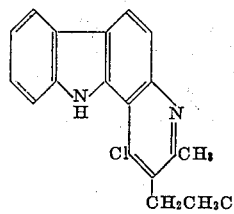

3.29 grams of this dichloro-compound are heated to 150–180° C. with 4 grams of β-diethylamino-ethylamine in 5 grams of phenol for one hour. After cooling, the mixture is dissolved in ether, the phenol is removed by washing with aqueous sodium hydroxide solution and the ethereal solution is evaporated to dryness. The residue is heated in vacuo to remove unreacted diamine, then, by addition of an ethereal solution of hydrochloric acid, the base hydrochloride salt, having a melting point of 280° C., is obtained in a yield of 0.5 gram. This bz-indolo-1-β-diethylaminoethyl- 4- methyl- 2,3- dihydropyrrolo- (3.2-c)quinoline base compound has the formulae first set forth above in this example.

*Example 2*

Synthesis of the compound represented by the formula:

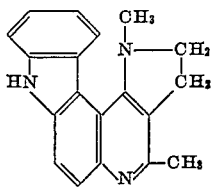

3-aminocarbazole and α-aceto-γ-butyrolactone are condensed under the conditions usual for formation of Schiff's bases and this condensation product is treated with phosphorus oxychloride in a liquid hydrocarbon solvent medium to cause cyclization and to yield the dichloro-derivative, melting point 215° C., represented by the formula:

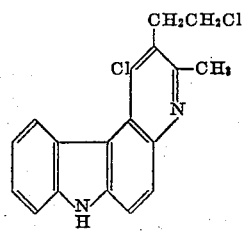

About 20 grams of this dichloro-compound are heated with 20 grams of phenol to a temperature of 160–180° C. and methylamine is introduced into the mixture. An exothermic reaction occurs and, after it is completed, the mixture is kept at a temperature of 160–180° for another one-half hour, then it is allowed to cool and it is poured into 300 cubic centimeters of 2-N sodium hydroxide solution. The solution is filtered under suction from an undissolved residue, the residue is dissolved in dilute acetic acid and the acetic acid solution is extracted with ether. This new bz-indolo-1,4-dimethyl-2,3-dihydropoyrrolo-(3.2-c)quinoline base is precipitated from the acetic acid solution by addition of sodium hydroxide solution and, upon being recrystallized from ethanol, it had a melting point of 262° C.

*Example 3*

Synthesis of the compound represented by the formula:

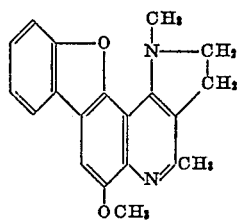

2-amino-3-methoxy-diphenylene oxide and α-acetyl-γ-butyrolactone are condensed under the conditions usual for formation of Schiff's bases and this condensation product is treated with phosphorus oxychloride in a liquid hydrocarbon solvent medium to cause cyclization and to yield the dichloro-derivative, melting point 207° C., represented by the formula:

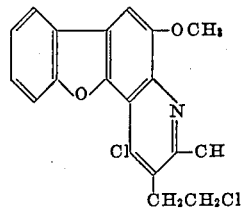

About 13 parts by weight of this dichloride and 15 parts by weight of phenol are mixed and heated to a temperature of 150–180° C., whereupon methylamine is introduced and, as in the preceding example, the reaction mixture is kept for another one-half hour at a temperature of from 150–180° C. after the exothermic reaction ceases, then it is allowed to cool and it is poured into 2-N sodium hydroxide solution. The residual matter insoluble in sodium hydroxide solution is recovered as described in Example 2, then it is recrystallized from ethanol. Its melting point is 227° C. This bz-benzofurano-1,4-dimethyl - 6 - methoxy-2,3-dihydropyrrolo-(3.2-c)-quinoline compound has the formula first set forth above in this example.

Attention is directed to our copending United States application Serial Nos. 351,751 and 351,752, also filed on April 28, 1953, wherein we have described and claimed other dihydropyrrolo-(3.2-c)quinoline derivatives and processes for their production.

Having thus described the subject matter of this invention, what it is desired to secure by Letters Patent is:

1. As a new chemical compound, a substance chosen from the group of compounds represented by the formula:

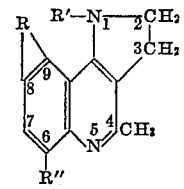

wherein R is a bridging group, linked to the pair of adjacent positions numbered 8, 9 of the bz-nucleus, chosen from the group of radicals represented by the formulae:

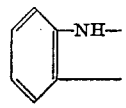

and

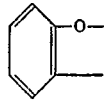

R' is chosen from the group consisting of methyl and diethylaminoethyl; and R" is chosen from the group consisting of hydrogen and methoxy.

2. As a new chemical compound, the substance represented by the formula:

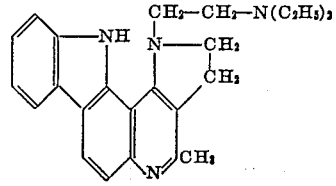

3. As a new chemical compound, the substance represented by the formula:
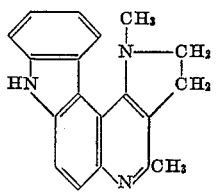
4. As a new chemical compound, the substance represented by the formula:
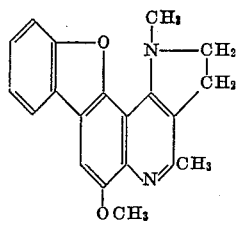
References Cited in the file of this patent
UNITED STATES PATENTS
| Number | Name | Date |
| --- | --- | --- |
| 2,196,776 | McNally et al. | Apr. 9, 1940 |
| 2,650,229 | Timmler et al. | Aug. 25, 1953 |